(12) United States Patent
Onaka et al.

(10) Patent No.: US 9,478,846 B2
(45) Date of Patent: Oct. 25, 2016

(54) ANTENNA DEVICE

(71) Applicant: Murata Manufacturing Co., Ltd., Nagaokakyo-shi, Kyoto-fu (JP)

(72) Inventors: Kengo Onaka, Nagaokakyo (JP); Hiroya Tanaka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 57 days.

(21) Appl. No.: 14/709,837

(22) Filed: May 12, 2015

(65) Prior Publication Data

US 2015/0244059 A1 Aug. 27, 2015

Related U.S. Application Data

(63) Continuation of application No. PCT/JP2013/071549, filed on Aug. 8, 2013.

(30) Foreign Application Priority Data

Nov. 13, 2012 (JP) ................. 2012-248927

(51) Int. Cl.
 *H01Q 1/22* (2006.01)
 *H01Q 5/378* (2015.01)
 *H01Q 1/44* (2006.01)
 *H01Q 21/28* (2006.01)
 *H01Q 9/40* (2006.01)

(52) U.S. Cl.
 CPC .............. *H01Q 1/2266* (2013.01); *H01Q 1/44* (2013.01); *H01Q 5/378* (2015.01); *H01Q 9/40* (2013.01); *H01Q 21/28* (2013.01)

(58) Field of Classification Search
 USPC .......................................... 343/881, 882, 902
 See application file for complete search history.

(56) References Cited

U.S. PATENT DOCUMENTS

| 6,414,643 B2 * | 7/2002 | Cheng .................... H01Q 1/084 343/702 |
| 9,136,590 B2 * | 9/2015 | Hotta ..................... H01Q 1/243 |
| 2003/0134669 A1 | 7/2003 | Byun et al. |

(Continued)

FOREIGN PATENT DOCUMENTS

| CN | 102544699 A | 7/2012 |
| JP | 2007/214740 A | 8/2007 |

(Continued)

OTHER PUBLICATIONS

International Search Report for PCT/JP2013/071549 date, of mailing Nov. 12, 2013.
Written Opinion of the International Searching Authority for PCT/JP2013/071549, date of mailing Nov. 12, 2013.

*Primary Examiner* — Howard Williams
(74) *Attorney, Agent, or Firm* — Arent Fox LLP

(57) ABSTRACT

A first housing includes a first conductor plate, and a second housing includes a second conductor plate. A rotation mechanism openably and closably attaches the second housing to the first housing. A first driven element and a second driven element are arranged along a rotation axis of the rotation mechanism. Between the first driven element and the second driven element, a continuity structure intersects the rotation axis to establish direct-current or high-frequency continuity between the first conductor plate and the second conductor plate. An antenna device can be provided which can ensure sufficient isolation between a plurality of driven elements.

20 Claims, 17 Drawing Sheets

(56) References Cited

U.S. PATENT DOCUMENTS

| | | |
|---|---|---|
| 2007/0210970 A1 | 9/2007 | Egawa et al. |
| 2011/0063175 A1 | 3/2011 | Uno et al. |
| 2012/0068893 A1* | 3/2012 | Guterman ............ H01Q 1/2266 343/702 |
| 2014/0097992 A1* | 4/2014 | Cheng .................... H01Q 1/243 343/702 |
| 2016/0118718 A1 | 4/2016 | Guterman et al. |

FOREIGN PATENT DOCUMENTS

| | | |
|---|---|---|
| JP | 2008-219597 A | 9/2008 |
| JP | 2009-164772 A | 7/2009 |
| JP | 2011-19211 A | 1/2011 |
| JP | 2011-239347 A | 11/2011 |
| WO | WO 2006/013659 A1 | 2/2006 |
| WO | WO 2009/139100 A1 | 11/2009 |
| WO | WO 2012/039879 A1 | 3/2012 |

* cited by examiner

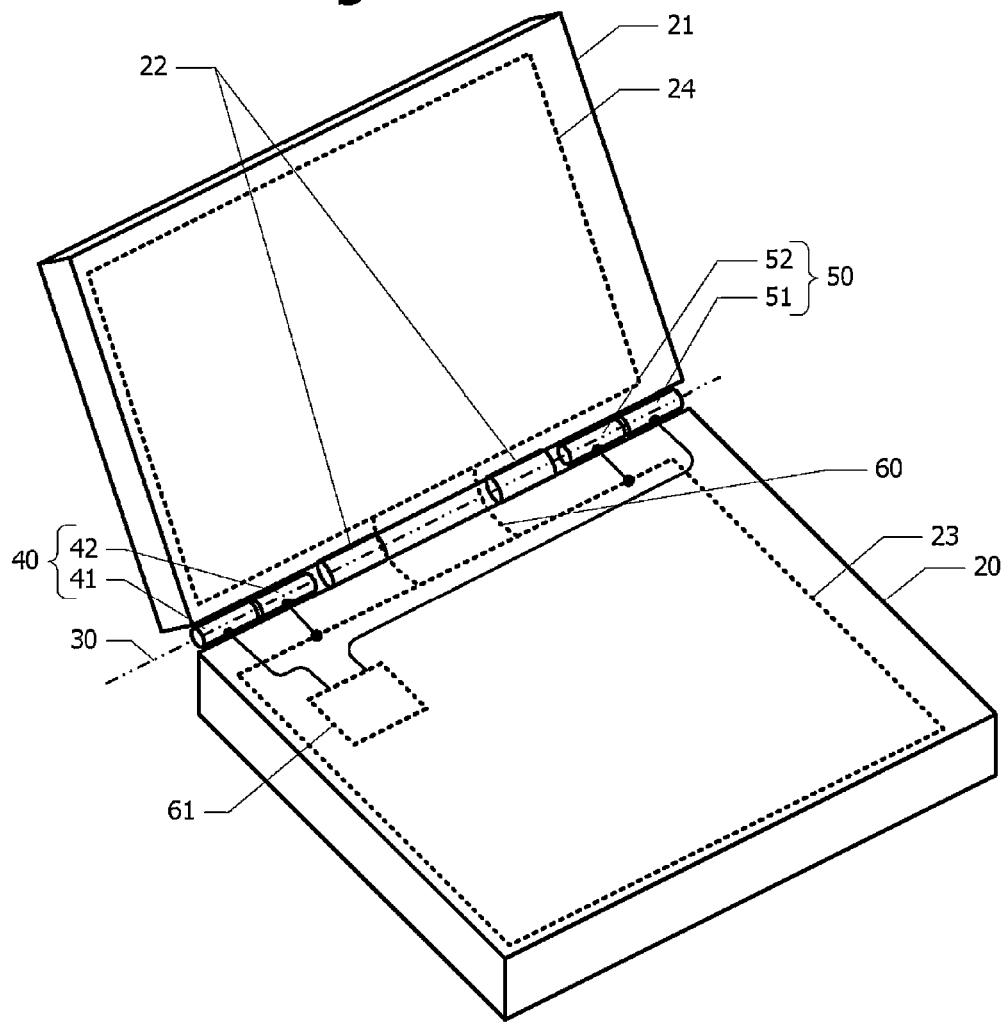

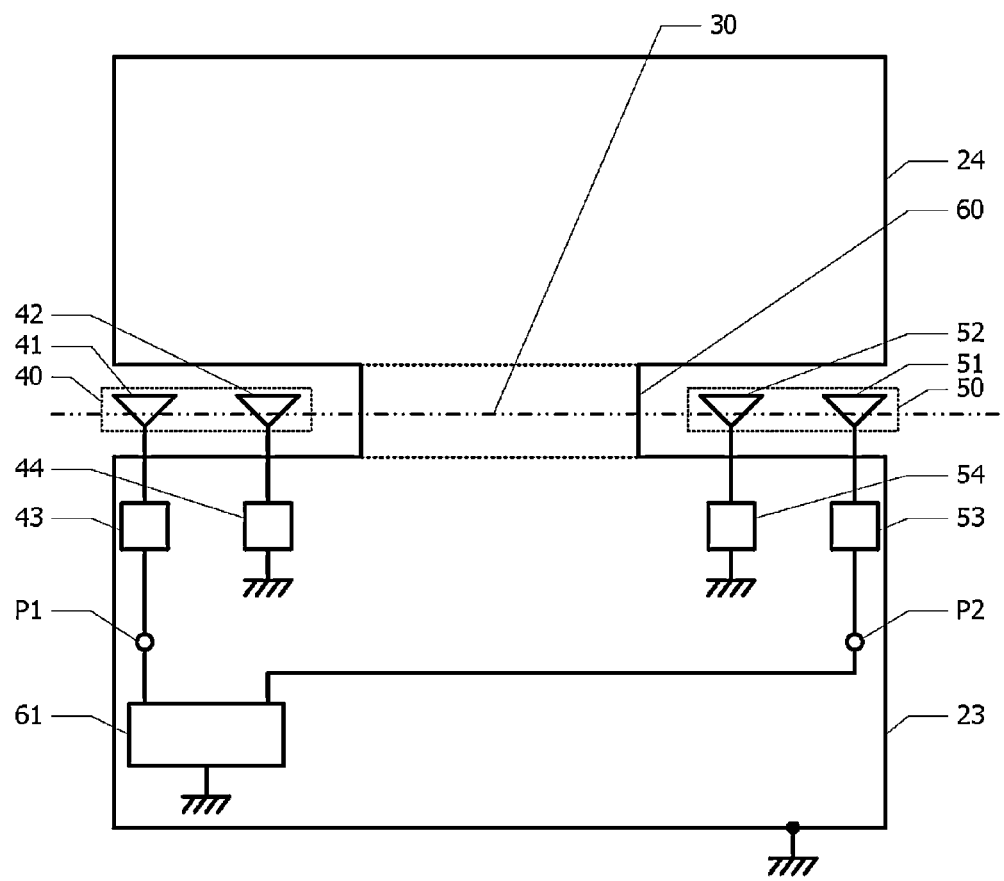

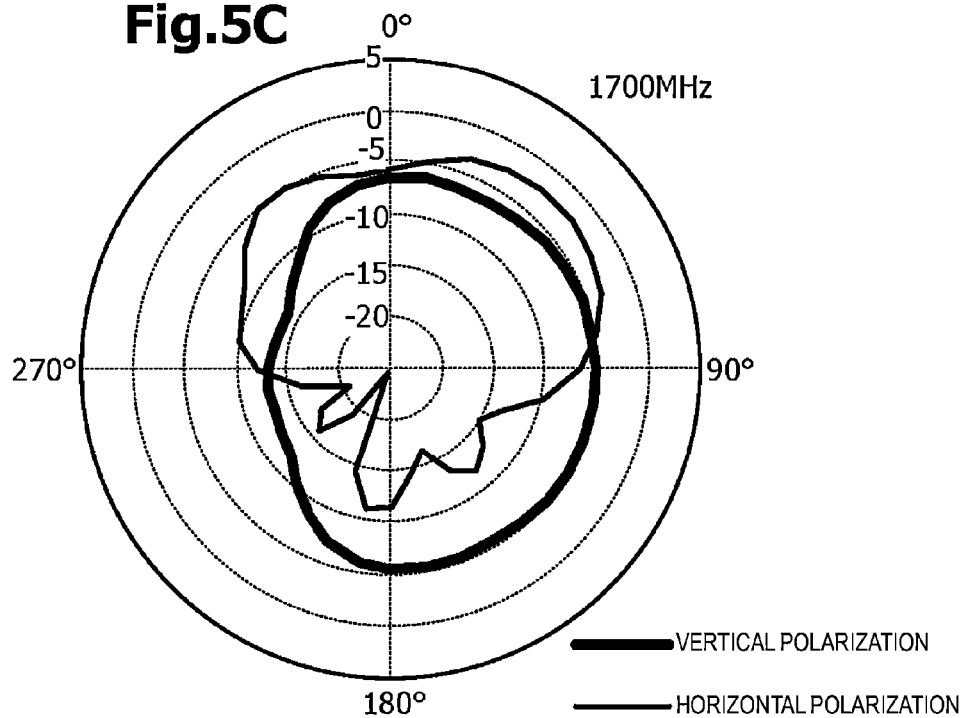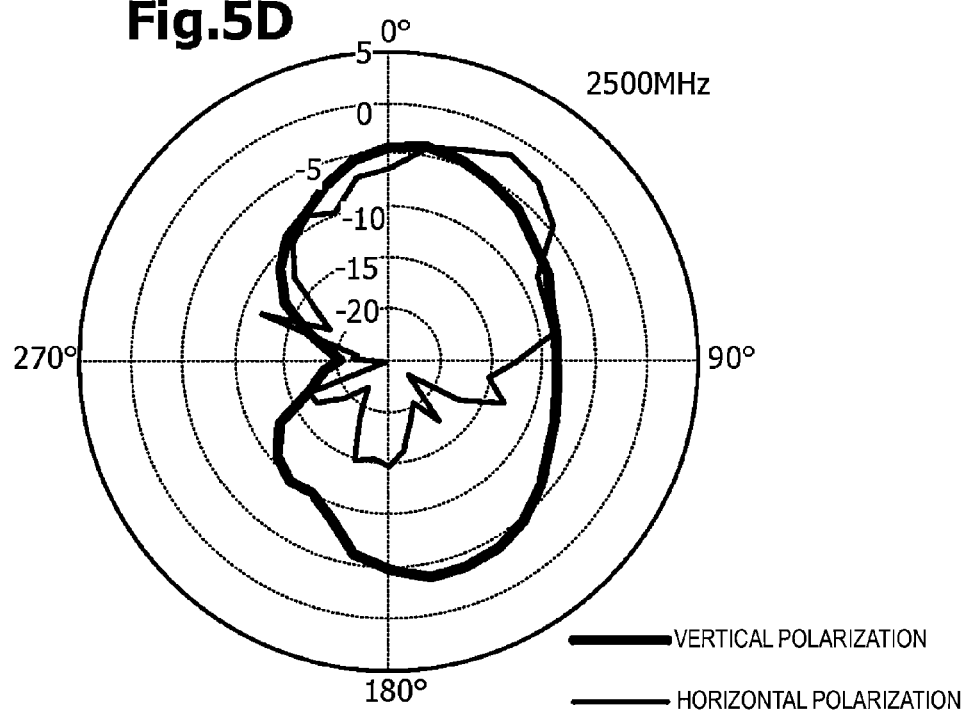

Fig.6
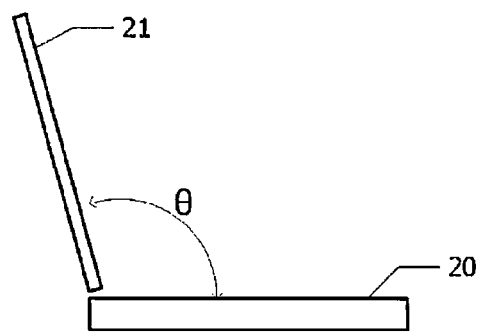
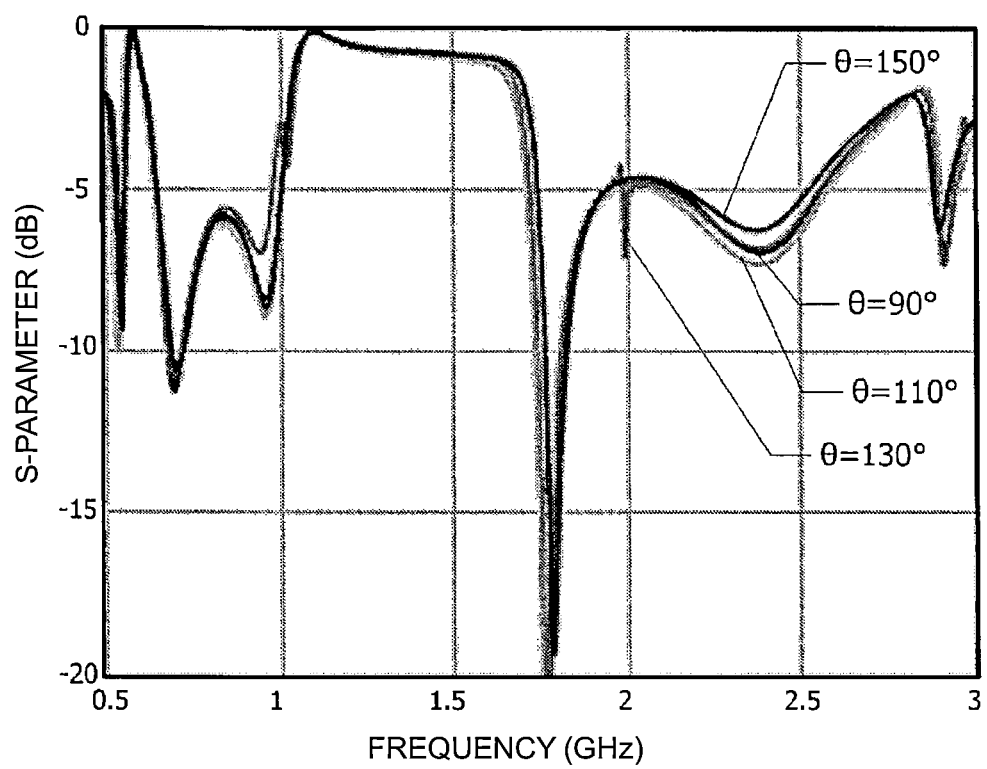

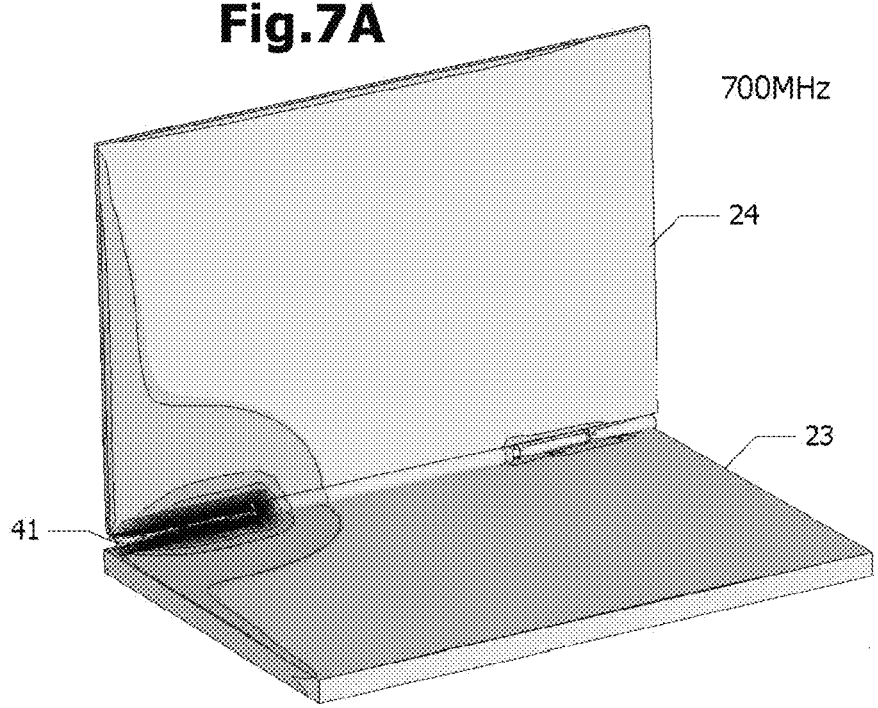
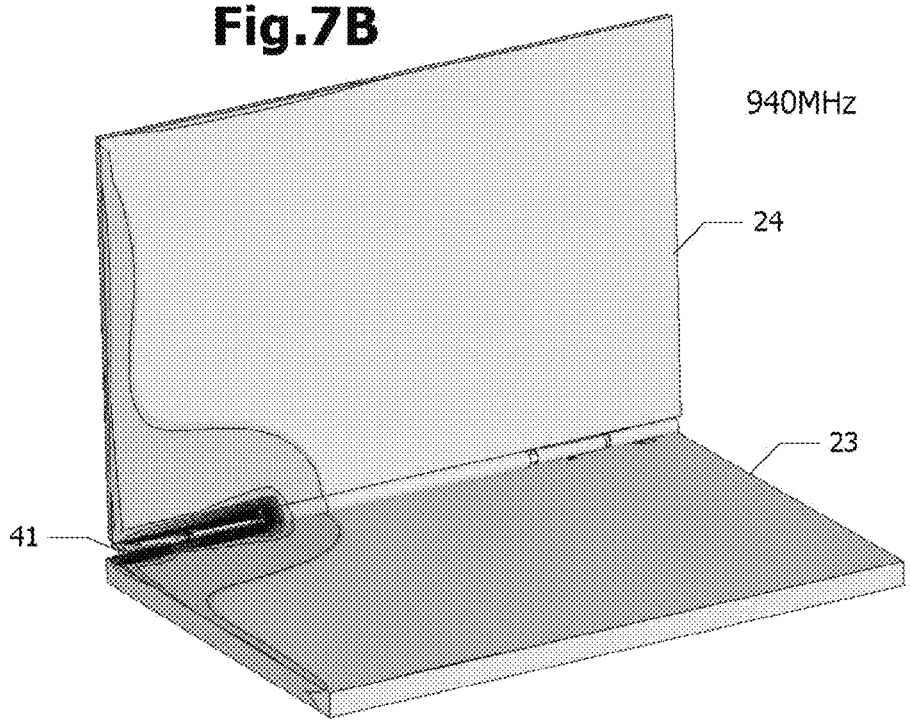

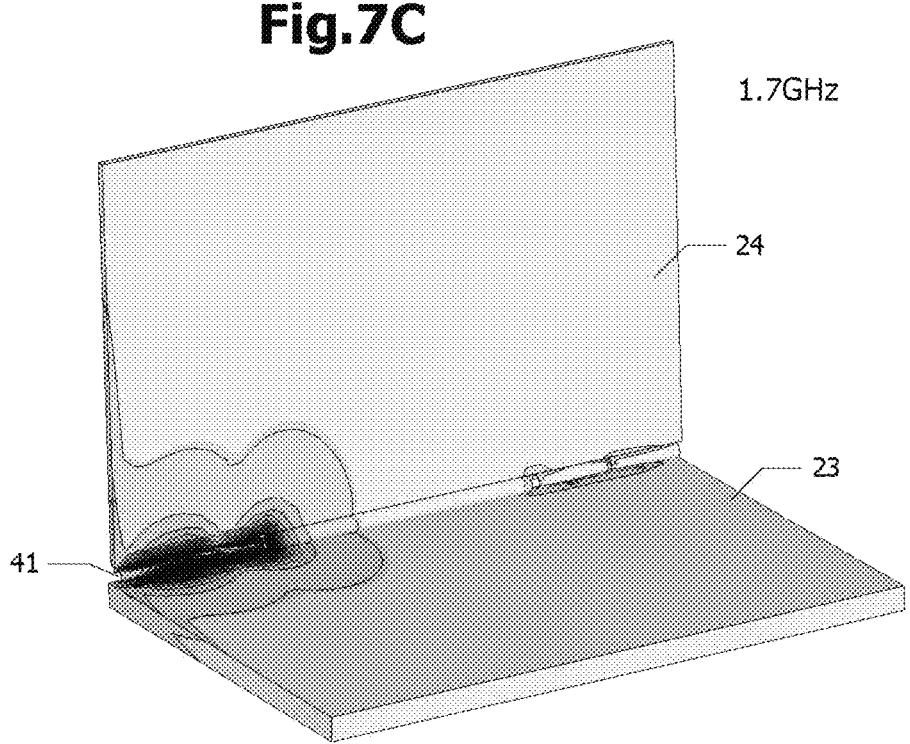
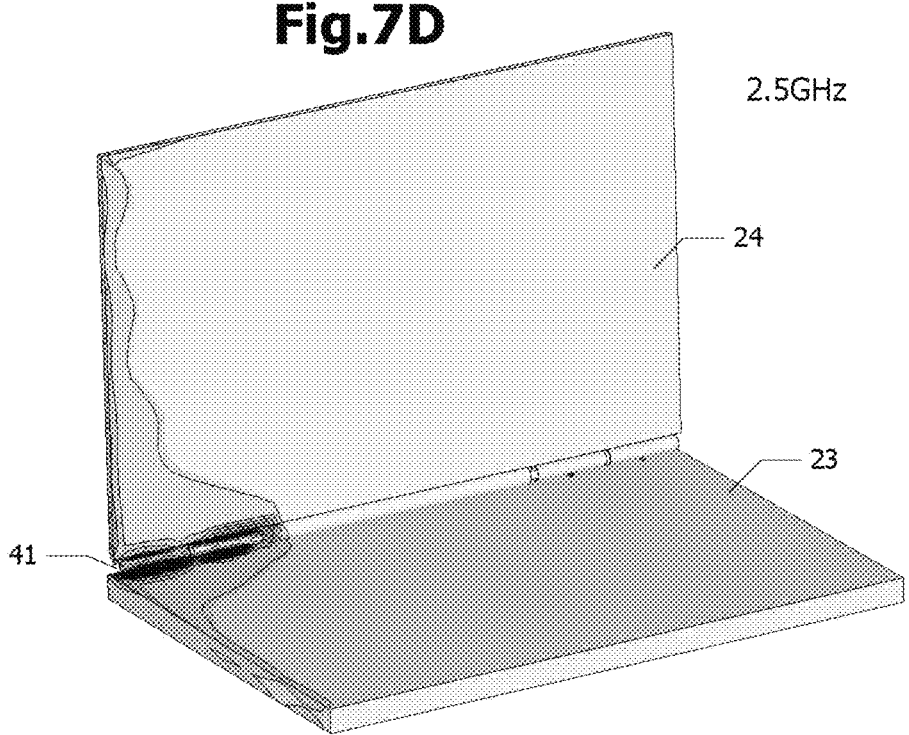

ANTENNA DEVICE

CROSS-REFERENCE TO RELATED APPLICATIONS

The present application is a continuation of PCT/JP2013/071549 filed Aug. 8, 2013, which claims priority to Japanese Patent Application No. 2012-248927, filed Oct. 13, 2012, the entire contents of each of which are incorporated herein by reference.

FIELD OF THE INVENTION

The present invention relates to an antenna device that includes a rotation mechanism configured to openably and closably couple a pair of housings, and antenna elements arranged along a rotation axis of the rotation mechanism.

BACKGROUND OF THE INVENTION

An antenna structure in which an antenna element is disposed on a hinge portion of a folding mobile terminal is known. In an antenna structure disclosed in Patent Document 1, an antenna element for a non-contact IC card is disposed on a cylindrical hinge portion. With this structure, stable wireless communication with a reader and writer can be ensured on both sides of a mobile terminal.

In an antenna structure disclosed in Patent Document 2, an antenna element formed by a ring conductor having a C-shaped cross section is disposed in a hinge portion. Capacitive coupling of the ring conductor to a metal rotation shaft can provide a wide-band antenna having a high degree of design freedom.

In an antenna structure disclosed in Patent Document 3, a hinge shaft is used as an element conductor. Using the hinge shaft as an element conductor makes it possible to reduce the size of a mobile terminal.

In an antenna structure disclosed in Patent Document 4, a hinge is used as a ground, and the hinge and an antenna element operate as a dipole antenna.

In an antenna structure disclosed in Patent Document 5, hinges are disposed at both ends of a rotation axis of a folding electronic device, and antenna elements are interposed between the hinges.

Patent Document 1: Japanese Unexamined Patent Application Publication No. 2007-214740
Patent Document 2: Japanese Unexamined Patent Application Publication No. 2011-19211
Patent Document 3: International Publication No. 2009/139100
Patent Document 4: Japanese Unexamined Patent Application Publication No. 2011-239347
Patent Document 5: International Publication No. 2012/039879

SUMMARY OF THE INVENTION

In recent years, MIMO multiplex communication technology has been adopted to improve the speed of communication. In MIMO multiplex communication, which involves using a plurality of antennas, it is desired to ensure sufficient isolation between the antennas. With a conventional antenna structure, it is difficult to ensure sufficient isolation.

An object of the present invention is to provide an antenna device that can ensure sufficient isolation between a plurality of driven elements.

An aspect of the present invention provides an antenna device that includes a first housing including a first conductor plate, a second housing including a second conductor plate, a rotation mechanism configured to openably and closably attach the second housing to the first housing, a first driven element and a second driven element arranged along a rotation axis of the rotation mechanism, and a continuity structure intersecting the rotation axis between the first driven element and the second driven element to establish direct-current or high-frequency continuity between the first conductor plate and the second conductor plate.

Providing the continuity structure between the first driven element and the second driven element makes it possible to improve isolation between the first driven element and the second driven element and achieve a small correlation coefficient.

Dimensions of the first conductor plate and the second conductor plate in a direction perpendicular to the rotation axis may be greater than or equal to one-quarter of a wavelength corresponding to the lowest frequency in an operating frequency band for the first driven element and the second driven element.

Since the first conductor plate and the second conductor plate perform a dipole operation, it is possible to improve radiation efficiency.

The antenna device may further include a high-frequency circuit mounted in one of the first housing and the second housing, a first parasitic element disposed along the rotation axis and electromagnetically coupled to the first driven element, and a second parasitic element disposed along the rotation axis and electromagnetically coupled to the second driven element.

With the first parasitic element and the second parasitic element, it is possible to improve radiation efficiency, achieve a multi-resonant state, and widen the operation bandwidth.

When the second housing is opened and closed relative to the first housing, the first driven element may have a surface facing the second conductor plate at any position within a range of motion of the second housing. The surface of the first driven element facing the second conductor plate may have a shape that coincides with part of a periphery of a virtual cylinder centered on the rotation axis.

Thus, stable electromagnetic coupling between the first driven element and the second conductor plate can be ensured.

The rotation mechanism may include a first member secured to the first housing and a second member secured to the second housing, the first member and the second member may be made of a conductive material, and the rotation mechanism may also serve as the continuity structure.

The rotation mechanism may include a first member secured to the first housing, electrically connected to the first conductor plate, and made of a conductive material, and a second member secured to the second housing. The first member may also serve as the first parasitic element.

The rotation mechanism may include a first member secured to the first housing, connected to the high-frequency circuit, and made of a conductive material, and a second member secured to the second housing. The first member may also serve as the first driven element.

In a frequency band between a first frequency band and a second frequency band higher than and separate from the first frequency band, a first antenna element formed by the first driven element and the first parasitic element may have a return loss higher than return losses in the first frequency band and the second frequency band, and may operate in the first frequency band and the second frequency band. The first antenna element may operate in a multi-resonant state. The antenna device may further include a first LC parallel resonance circuit inserted in series with at least one of the first driven element and the first parasitic element. A resonance point of one of the first driven element and the first parasitic element, the one being an element with which the first LC parallel resonance circuit is inserted in series may be divided by the insertion of the first LC parallel resonance circuit and may appear in the first frequency band and the second frequency band.

The antenna device may further include a second LC parallel resonance circuit inserted in series with the other of the first driven element and the first parasitic element, the other being an element for which the first LC parallel resonance circuit is not inserted. A resonance point of the other of the first driven element and the first parasitic element, the other being the element with which the second LC parallel resonance circuit is inserted in series may be divided by the insertion of the second LC parallel resonance circuit and may appear in the first frequency band and the second frequency band.

A primary resonance point and a secondary resonance point of the other of the first driven element and the first parasitic element, the other being an element for which the first LC parallel resonance circuit is not inserted, may appear in the first frequency band and the second frequency band, respectively.

The first housing may include a tubular member that partly surrounds the rotation axis in a circumferential direction, and the first driven element may be formed on an inner periphery of the tubular member.

Providing the continuity structure between the first driven element and the second driven element makes it possible to improve isolation between the first driven element and the second driven element and achieve a small correlation coefficient. Allowing the first conductor plate and the second conductor plate to perform a dipole operation can improve radiation efficiency. With the first parasitic element and the second parasitic element, it is possible to improve radiation efficiency, achieve a multi-resonant state, and widen the operation bandwidth. When the first driven element has a surface facing the second conductor plate at any position within a range of motion of the second housing, it is possible to ensure stable electromagnetic coupling between the first driven element and the second conductor plate.

BRIEF DESCRIPTION OF THE DRAWINGS

FIG. 1 is a perspective view of an electronic apparatus including an antenna device according to a first embodiment.

FIG. 3 is a block diagram of a simulated antenna device.

FIGS. 5C and 5D are graphs each showing a result of simulation on directional characteristics of the first antenna element.

FIG. 6 is a graph showing a result of simulation on return loss S11 carried out under conditions where an angle θ formed between the first conductor plate and the second conductor plate was 90°, 110°, 130°, and 150°.

FIGS. 7A and 7B are graphs each showing a result of simulation on the magnitude of current excited by a ground plate, that is, by the first conductor plate, the second conductor plate, and a continuity structure.

FIGS. 7C and 7D are graphs each showing a result of simulation on the magnitude of current excited by the ground plate, that is, by the first conductor plate, the second conductor plate, and the continuity structure.

DETAILED DESCRIPTION OF THE EXEMPLARY EMBODIMENTS

First Embodiment

Figure 2A:
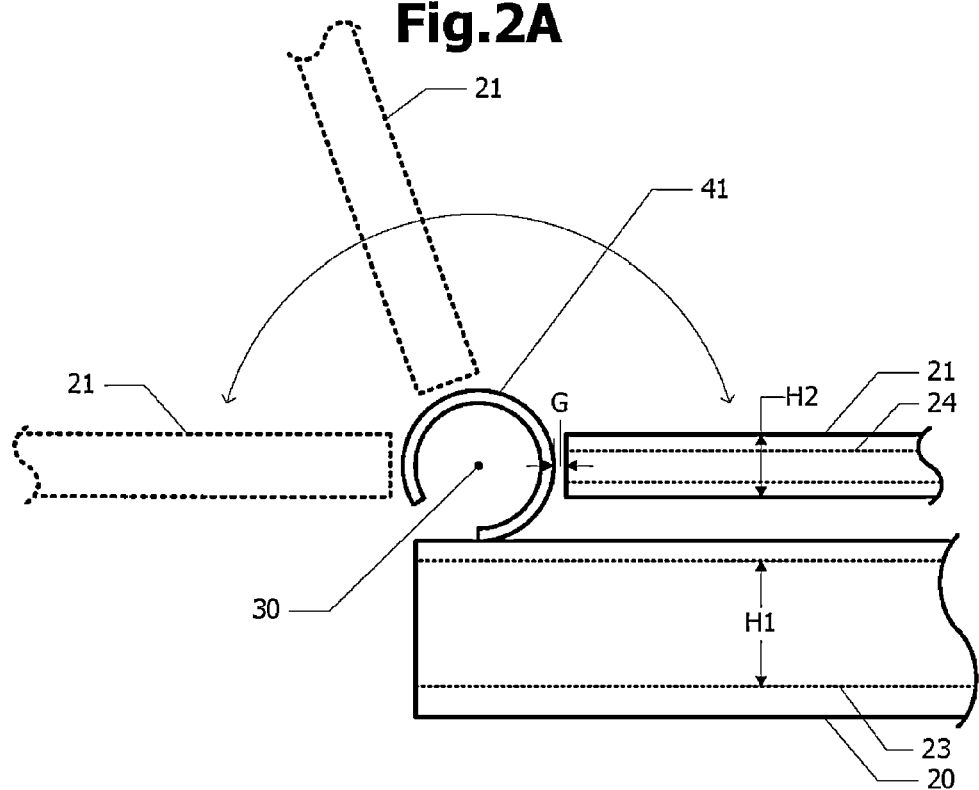
FIG. 2A is a cross-sectional view of a first driven element, a first housing, and a second housing perpendicular to a rotation axis.

FIG. 1 is a schematic perspective view of an electronic apparatus including an antenna device according to a first embodiment. A second housing 21 is openably and closably attached to a first housing 20 by rotation mechanisms 22. For example, the first housing 20 contains a keyboard and the second housing 21 contains a liquid crystal panel. The rotation mechanisms 22 include, for example, hinges. The first housing 20 contains a first conductor plate 23, and the second housing 21 contains a second conductor plate 24. When the first housing 20 is made of an insulating material, such as resin, the first conductor plate 23 is disposed inside the first housing 20. When the first housing 20 is made of a conductive material, such as metal, the first housing 20 also serves as the first conductor plate 23. Similarly, the second housing 21 contains or serves as the second conductor plate 24.

A first driven element 41, a first parasitic element 42, a second driven element 51, and a second parasitic element 52 are arranged along a rotation axis 30 of the rotation mechanisms 22. The first driven element 41 and the first parasitic element 42 are electromagnetically coupled to each other to form a first antenna element 40. Similarly, the second driven element 51 and the second parasitic element 52 are electromagnetically coupled to each other to form a second antenna element 50.

In a direction parallel to the rotation axis 30, the first driven element 41 and the second driven element 51 are disposed at both ends. The first parasitic element 42 and the second parasitic element 52 are disposed inside the first driven element 41 and the second driven element 51, respectively. When sufficient antenna characteristics can be achieved without the first parasitic element 42 and the second parasitic element 52, the first parasitic element 42 and the second parasitic element 52 may be removed. The first parasitic element 42 may be disposed on an outermost side and the first driven element 41 may be disposed inside the first parasitic element 42. Similarly, the second parasitic element 52 may be disposed on an outermost side and the second driven element 51 may be disposed inside the second parasitic element 52. The rotation mechanisms 22 are interposed between the first antenna element 40 and the second antenna element 50.

Between the first antenna element 40 and the second antenna element 50, a continuity structure 60 intersects the rotation axis 30 to establish direct-current or high-frequency continuity between the first conductor plate 23 and the second conductor plate 24. The term "direct-current continuity" refers to a state where the first conductor plate 23 and the second conductor plate 24 are electrically short-circuited to each other. The term "high-frequency continuity" refers to a state where, in a frequency band where the first antenna element 40 and the second antenna element 50 operate, the first conductor plate 23 and the second conductor plate 24 are electrically connected to each other at low impedance. For example, if the impedance between the first conductor plate 23 and the second conductor plate 24 is several ohms (Ω) or less, the first conductor plate 23 and the second conductor plate 24 can be referred to as being virtually in "continuity". For example, a conductive pattern formed on a flexible printed circuit board that connects an electronic circuit in the first housing 20 to an electronic circuit in the second housing 21 serves as the continuity structure 60. Examples of the flexible printed circuit board serving as the continuity structure 60 include those having various structures, but the description of specific structures will be omitted here.

The first housing 20 contains a high-frequency circuit 61. The second housing 21 may contain the high-frequency circuit 61. The high-frequency circuit 61 supplies a high-frequency signal to the first driven element 41 and the second driven element 51, and processes the high-frequency signal received by the first driven element 41 and the second driven element 51. The first parasitic element 42 and the second parasitic element 52 are connected to the first conductor plate 23. An impedance matching circuit may be inserted between the first driven element 41 and the high-frequency circuit 61, and between the first parasitic element 42 and the first conductor plate 23.

FIG. 2A is a cross-sectional view of the first driven element 41, the first housing 20, and the second housing 21 perpendicular to the rotation axis 30. The second housing 21 in a closed state relative to the first housing 20 is indicated by a solid line, and the second housing 21 in an open state relative to the first housing 20 is indicated by a broken line. For example, the range of motion of the second housing 21 is 180°. The second conductor plate 24 in the second housing 21 faces the first driven element 41 with a gap G therebetween. The first driven element 41 has a surface facing the second conductor plate 24 at any position within the range of motion of the second housing 21. For example, the surface of the first driven element 41 facing the second conductor plate 24 has a shape that coincides with part of the periphery of a virtual cylinder centered on the rotation axis 30. The gap G is the same at any position within the range of motion of the second housing 21. The first parasitic element 42, the second driven element 51, and the second parasitic element 52 have the same cross-sectional shape as the first driven element 41.

Results of simulation on various characteristics of the antenna device according to the first embodiment will now be described. In a simulated antenna device, the first housing 20 and the second housing 21 are formed by plates of solid copper and also serve as the first conductor plate 23 and the second conductor plate 24, respectively. A thickness H1 of the first conductor plate 23 and a thickness H2 of the second conductor plate 24 are 13 mm and 4 mm, respectively. The gap G is 1 mm.

Figure 2B:
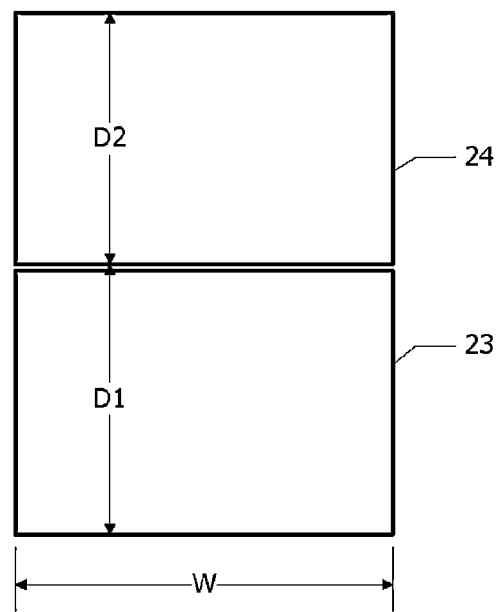
FIG. 2B is a plan view of a first conductor plate and a second conductor plate.

Referring to FIG. 2B, a dimension W of the first conductor plate 23 and the second conductor plate 24 in the horizontal direction is 330 mm. A dimension D1 of the first conductor plate 23 in the vertical direction is 225 mm, and a dimension D2 of the second conductor plate 24 in the vertical direction is 215 mm. The first antenna element 40 and the second antenna element 50 are symmetric with respect to a central virtual plane perpendicular to the rotation axis 30.

FIG. 3 is a block diagram of a simulated antenna device. The geometric positional relationship among the first conductor plate 23, second conductor plate 24, the continuity structure 60, the first driven element 41, the first parasitic element 42, the second driven element 51, and the second parasitic element 52 in FIG. 3 corresponds to the positional relationship in the actual antenna device.

The first driven element 41 and the second driven element 51 are disposed on the outermost sides along the rotation axis 30. The first parasitic element 42 and the second parasitic element 52 are disposed inside the first driven element 41 and the second driven element 51, respectively. The first driven element 41 and the first parasitic element 42 form the first antenna element 40. The second driven element 51 and the second parasitic element 52 form the second antenna element 50. The continuity structure 60 is interposed between the first parasitic element 42 and the second parasitic element 52. The first conductor plate 23 and the second conductor plate 24 are disposed on both sides of the rotation axis 30. The continuity structure 60 allows the first conductor plate 23 and the second conductor plate 24 to connect to each other. The first conductor plate 23, the continuity structure 60, and the second conductor plate 24 serve as a ground plate.

The first driven element 41 and the second driven element 51 are connected with impedance matching circuits 43 and 53 interposed therebetween, respectively, to the high-frequency circuit 61. The first parasitic element 42 and the second parasitic element 52 are connected with impedance matching circuits 44 and 54 interposed therebetween, respectively, to the first conductor plate 23. A point of interconnection between the high-frequency circuit 61 and the impedance matching circuit 43 is defined as a first port P1, and a point of interconnection between the high-frequency circuit 61 and the impedance matching circuit 53 is defined as a second port P2.

Figure 4A:
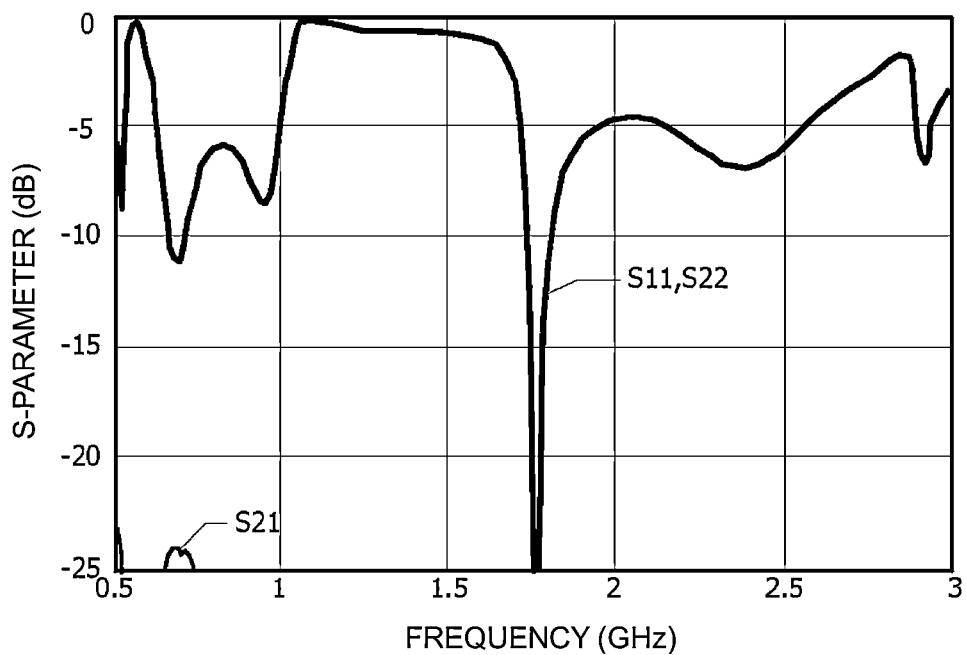
FIG. 4A is a graph showing a result of simulation on S-parameter of the antenna device.

FIG. 4A shows a result of simulation on S-parameter of the antenna device. The horizontal axis represents frequency in "GHz", and the vertical axis represents the magnitude of S-parameter in "dB". A thick solid line in FIG. 4A represents return losses S11 and S22, and a thin solid line in FIG. 4A represents isolation S21. The return loss S11 refers to a ratio of reflected power to input power when high-frequency power is supplied to the first port P1 (FIG. 3), and the return loss S22 refers to a ratio of reflected power to input power when high-frequency power is supplied to the second port P2 (FIG. 3). The isolation S21 refers to a ratio of power output to the second port P2 to input power when high-frequency power is supplied to the first port P1. An angle formed between the first conductor plate 23 and the second conductor plate 24 (FIG. 2A) is 90°. S11 is equal to S22, as the first antenna element 40 and the second antenna element 50 (FIG. 3) are plane-symmetrical.

Figure 4B:
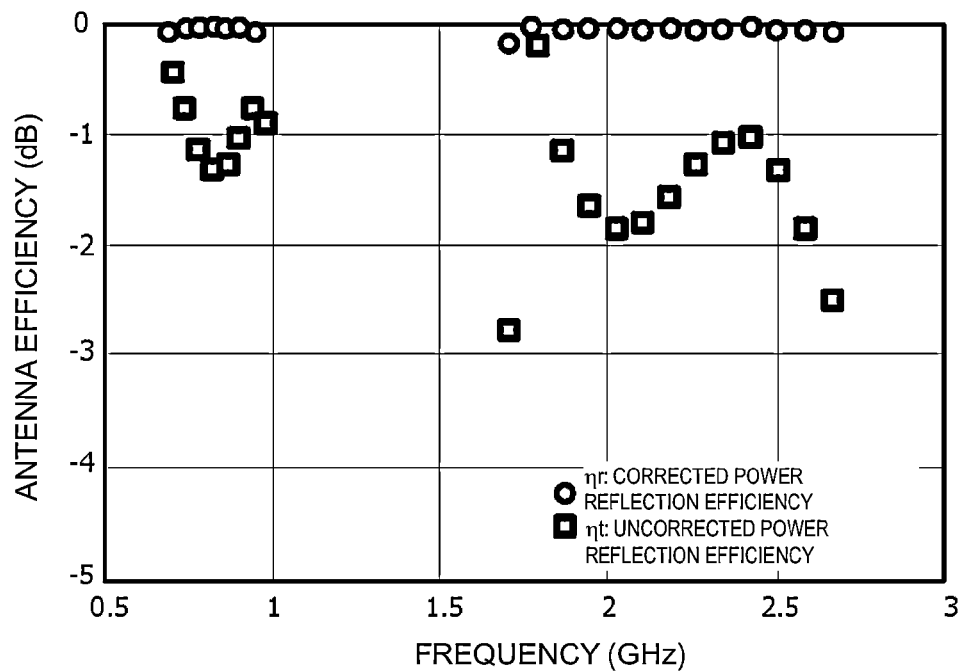
FIG. 4B is a graph showing a result of simulation on radiation efficiency of the antenna device.

FIG. 4B shows a result of simulation on radiation efficiency of the antenna device. The horizontal axis represents frequency in "GHz", and the vertical axis represents radiation efficiency in "dB". In FIG. 4B, circular symbols each represent corrected power reflection efficiency ηr, and rectangular symbols each represent uncorrected power reflection efficiency ηt. The "corrected power reflection efficiency" refers to radiation efficiency obtained when the first antenna element 40 and the second antenna element 50 are perfectly impedance-matched and there is infinite isolation between the first antenna element 40 and the second antenna element 50. The "uncorrected power reflection efficiency" refers to radiation efficiency obtained by taking return losses and isolation into consideration. The corrected power reflection efficiency ηr of the first antenna element 40 is equal to the corrected power reflection efficiency ηr of the second antenna element 50, and the uncorrected power reflection efficiency ηt of the first antenna element 40 is equal to the uncorrected power reflection efficiency ηt of the second antenna element 50.

Figure 5A:
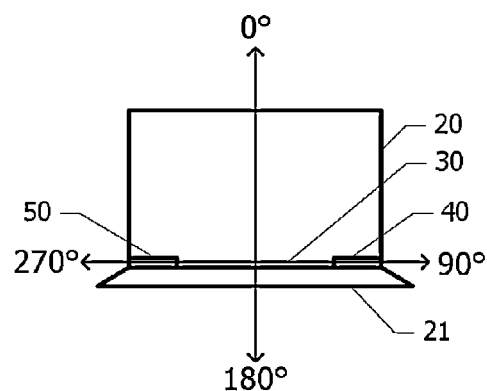
FIG. 5A is a plan view of the antenna device and shows definition of an azimuth angle.

FIG. 5A is a plan view of the antenna device and shows definition of an azimuth angle. The first housing 20 is disposed horizontally. An azimuth perpendicular to the rotation axis 30 and directed from the center of the rotation axis 30 toward the first housing 20 is defined as 0°, and a clockwise direction in plan view is defined as a positive direction of the azimuth angle.

Figure 5B:
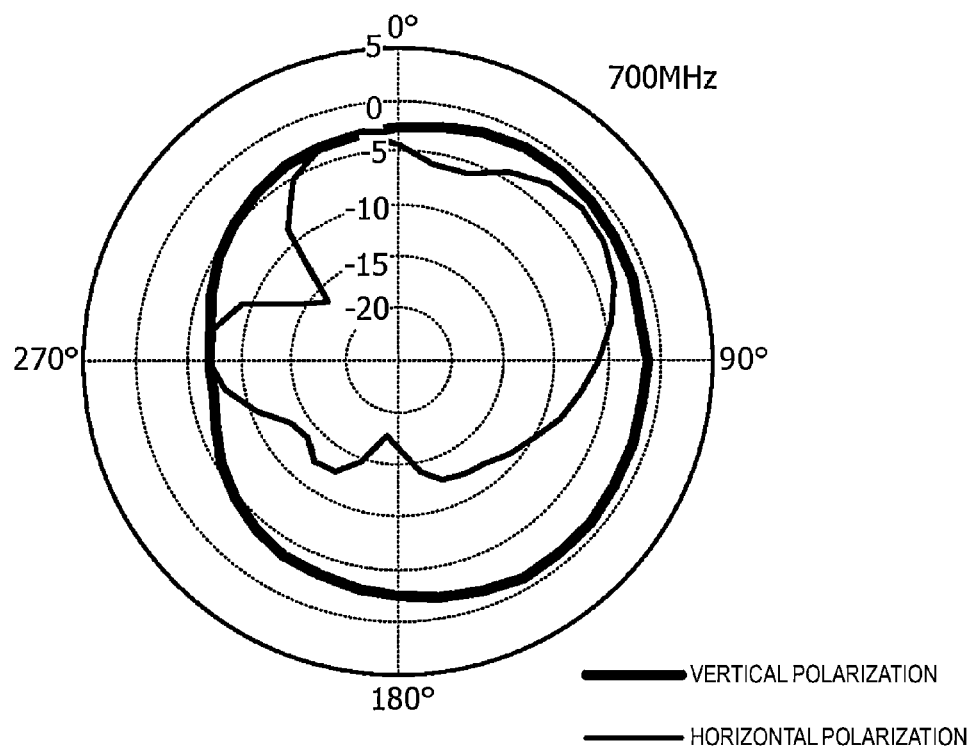
FIG. 5B is a graph showing a result of simulation on directional characteristics of a first antenna element.

FIGS. 5B to 5D each show a result of simulation on directional characteristics of the first antenna element 40. In any of these cases, the angle formed between the first housing 20 and the second housing 21 was set to 90°. FIGS. 5B, 5C, and 5D show directional characteristics at frequencies of 700 MHz, 1700 MHz, and 2500 MHz. Numerical values given to respective concentric circles in FIGS. 5B to 5D each represent radiation efficiency in "dB". In FIGS. 5B to 5D, a thick solid line represents directional characteristics of vertical polarization, and a thin solid line represents directional characteristics of horizontal polarization.

As illustrated in FIG. 4A, sufficient isolation between the first antenna element 40 and the second antenna element 50 is ensured. A correlation coefficient between the first antenna element 40 and the second antenna element 50 was 0.1 or less throughout the frequency range from 0.5 GHz to 3 GHz. As illustrated in FIG. 3, the continuity structure 60 serving as a ground plate is interposed between the first antenna element 40 and the second antenna element 50. This can make it possible to ensure sufficient isolation between the antenna elements and achieve a sufficiently small correlation coefficient.

The long term evolution (LTE) communication standard uses a low-frequency band (low band) ranging from 700 MHz to 960 MHz and a high-frequency band (high band) ranging from 1710 MHz 2700 MHz. The simulated antenna device is found to achieve sufficiently small return losses S11 and S22 (FIG. 4A) and sufficiently high radiation efficiency (FIG. 4B) in the low-frequency band and the high-frequency band in the LTE communication standard. In a frequency band between the low-frequency band and the high-frequency band, the return losses S11 and S22 are higher than those in the low-frequency band and the high-frequency band. When the high-frequency band is extended to range from 1575 MHz to 2700 MHz, the antenna device can also be used as a global positioning system (GPS) receiving antenna.

FIG. 6 shows a result of simulation on the return loss S11 carried out under conditions where the angle θ formed between the first conductor plate 23 and the second conductor plate 24 was 90°, 110°, 130°, and 150°. The horizontal axis represents frequency in "GHz", and the vertical axis represents the magnitude of S-parameter in "dB". Each curve in FIG. 6 is provided with the value of angle θ formed between the first conductor plate 23 and the second conductor plate 24.

FIG. 6 shows that the return loss S11 is substantially the same at least within the range of the angle θ from 90° to 150°. The simulation also showed that there was little change in radiation efficiency with varying angle θ.

FIGS. 7A to 7D show a result of simulation on the magnitude of current excited by the ground plate, that is, by the first conductor plate 23, the second conductor plate 24, and the continuity structure 60. The angle θ formed between the first conductor plate 23 and the second conductor plate 24 was set to 90°, and power was supplied to the first driven element 41. FIG. 7A, FIG. 7B, FIG. 7C, and FIG. 7D show distributions of current at frequencies of 700 MHz, 940 MHz, 1.7 GHz, and 2.5 GHz, respectively. In FIGS. 7A to 7D, the color density corresponds to the amplitude of excited current. The higher the color density, the greater the amplitude of current.

FIGS. 7A to 7D show that in the first conductor plate 23 and the second conductor plate 24, the amplitude of current is greater at an edge of the side where the first driven element 41 is disposed (on the left side in FIGS. 7A to 7D). The first conductor plate 23 and the second conductor plate 24 perform a dipole operation near the edge on the left side. The dipole operation of the first conductor plate 23 and the second conductor plate 24 improves the radiation efficiency of the antenna device. To achieve the effect of the dipole operation, it is preferable that the dimensions (D1 and D2 in FIG. 2B) of the first conductor plate 23 and the second conductor plate 24 in the direction perpendicular to the rotation axis 30 be greater than or equal to one-quarter of a wavelength corresponding to the lowest frequency in a frequency band (operating frequency band) in which the first driven element 41 and the first parasitic element 42 operate. For example, when the antenna device is operated under conditions satisfying the LTE communication standard, the lowest frequency is 700 MHz. In this case, the dimensions D1 and D2 of the first conductor plate 23 and the second conductor plate 24 are preferably about 10.7 cm or more.

In the antenna device of the first embodiment, as described above, the ground plate (continuity structure 60)

is interposed between the first antenna element 40 and the second antenna element 50 (FIGS. 1 and 3). This makes it possible to ensure sufficient isolation between the two antenna elements and keep the correlation coefficient low. Additionally, since the first conductor plate 23 and the second conductor plate 24 can be excited, it is possible to achieve high radiation efficiency. Since the first antenna element 40 and the second antenna element 50 are arranged along the rotation axis 30, there is no significant impact on the design of the electronic apparatus which includes the antenna device.

Second Embodiment

Figure 8A:
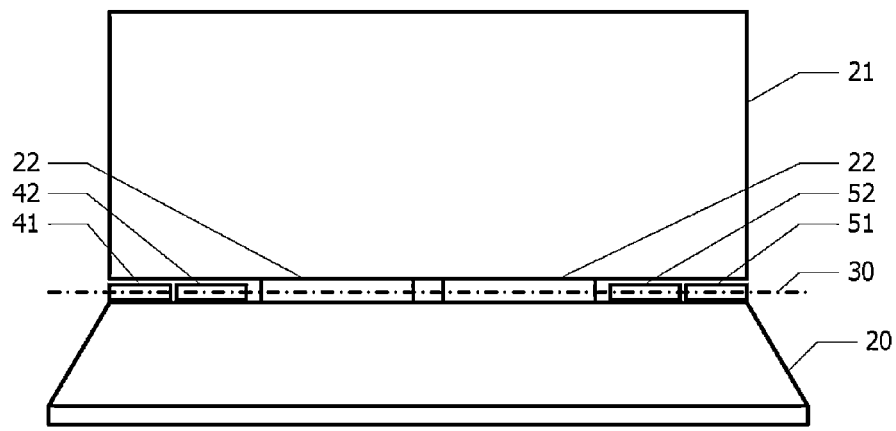
FIG. 8A is a perspective view of an antenna device according to a second embodiment.

FIG. 8A is a perspective view of an antenna device according to a second embodiment. Hereinafter, differences from the first embodiment will be described, and the description of the same configuration will be omitted. Along the rotation axis 30, the rotation mechanism 22, the first parasitic element 42, and the first driven element 41 are arranged in this order from the center to the left, whereas the rotation mechanism 22, the second parasitic element 52, and the second driven element 51 are arranged in this order from the center to the right.

Figure 8B:
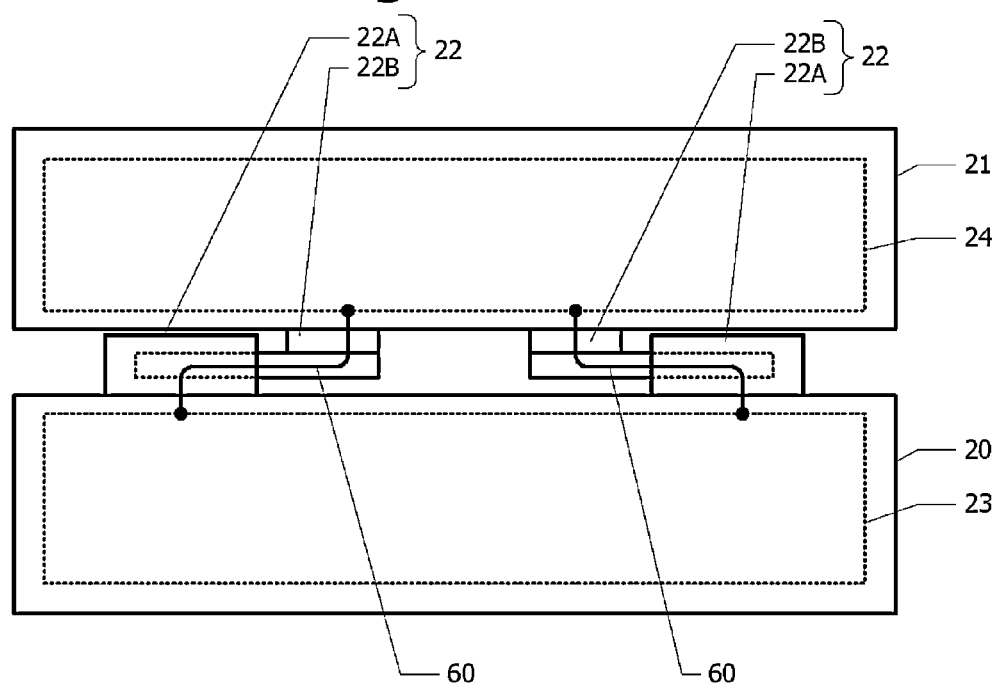
FIG. 8B is a schematic diagram of rotation mechanisms and their vicinity.

FIG. 8B is a schematic diagram of the rotation mechanisms 22 and their vicinity. The rotation mechanisms 22 each include a first member 22A secured to the first housing 20 and a second member 22B secured to the second housing 21. The first member 22A and the second member 22B are made of a conductive material, such as metal. The first member 22A is electrically connected to the first conductor plate 23, and the second member 22B is electrically connected to the second conductor plate 24. Continuity is ensured at the region of contact between the first member 22A and the second member 22B. Therefore, the first conductor plate 23 and the second conductor plate 24 are electrically connected to each other with the first member 22A and the second member 22B interposed therebetween. In the second embodiment, the rotation mechanisms 22 also serve as the continuity structure 60 (FIGS. 1 and 3).

Third Embodiment

Figure 9A:
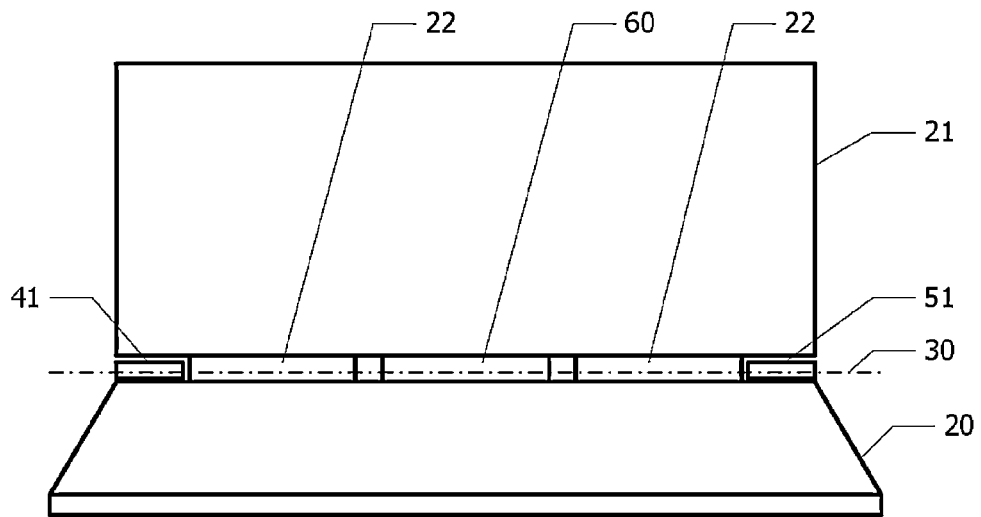
FIG. 9A is a perspective view of an antenna device according to a third embodiment.

FIG. 9A is a perspective view of an antenna device according to a third embodiment. Hereinafter, differences from the first embodiment will be described, and the description of the same configuration will be omitted. Along the rotation axis 30, the continuity structure 60 is disposed in the center, the rotation mechanism 22 and the first driven element 41 are arranged in this order from the center to the left, and the rotation mechanism 22 and the second driven element 51 are arranged in this order from the center to the right.

Figure 9B:
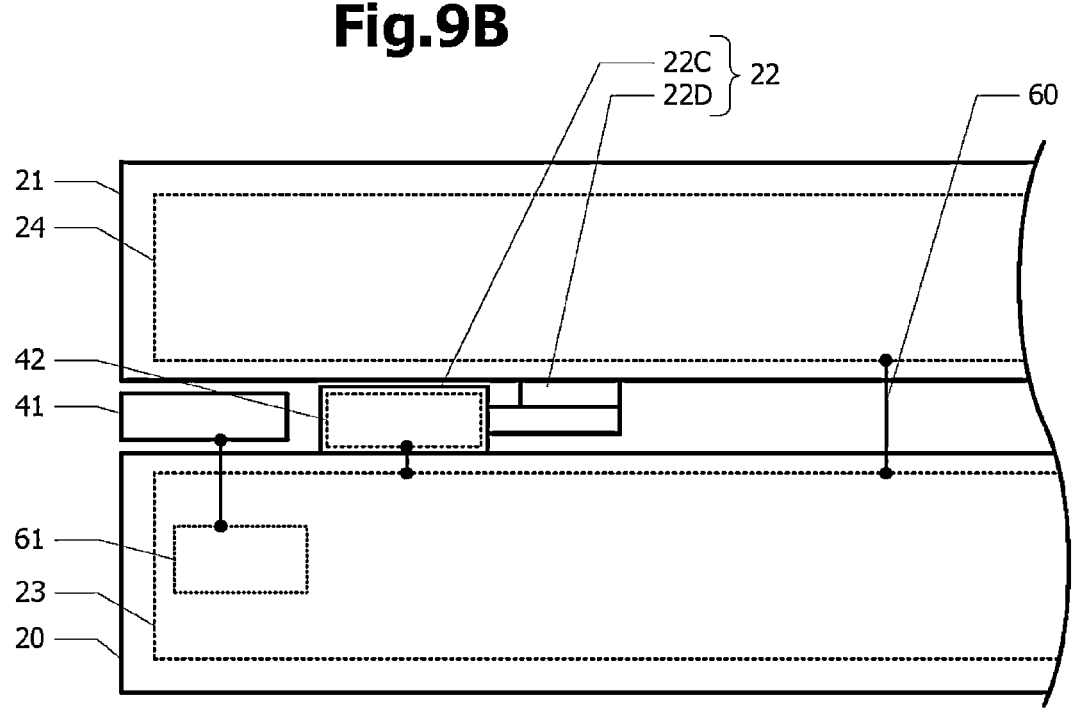
FIG. 9B is a schematic diagram of the first driven element, the rotation mechanism, and their vicinity.

FIG. 9B is a schematic diagram of the first driven element 41, the rotation mechanism 22, and their vicinity. The first driven element 41 is connected to the high-frequency circuit 61. The rotation mechanism 22 includes a first member 22C secured to the first housing 20 and a second member 22D secured to the second housing 21. At least part of the first member 22C is made of a conductive material, such as metal. The conductive part of the first member 22C also serves as the first parasitic element 42. The second member 22D and the second conductor plate 24 are preferably insulated from each other by an insulating resin or the like. The second member 22D secured to the second housing 21 may be used as the first parasitic element 42. In this case, the second member 22D is electrically connected to the second conductor plate 24, and the first member 22C is electrically insulated from the first conductor plate 23. In the third embodiment, as described above, at least part of the rotation mechanism 22 also serves as the first parasitic element 42.

Fourth Embodiment

Figure 10A:
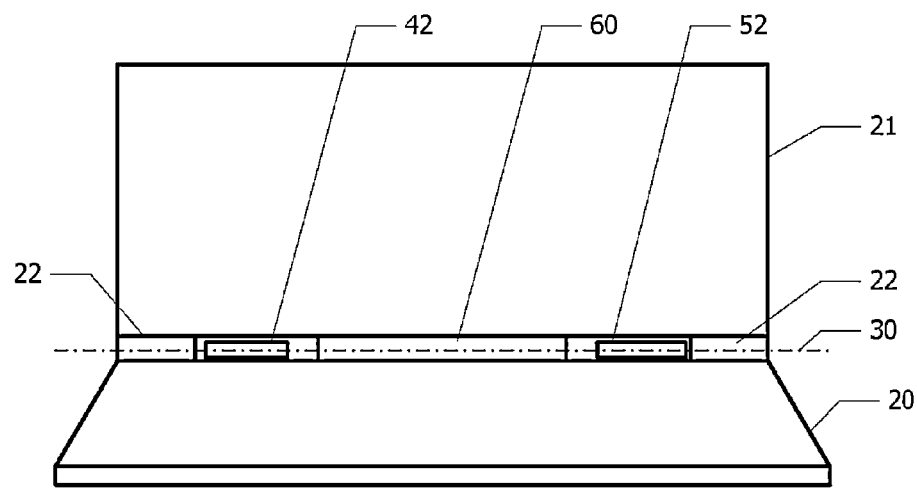
FIG. 10A is a perspective view of an antenna device according to a fourth embodiment.

FIG. 10A is a perspective view of an antenna device according to a fourth embodiment. Hereinafter, differences from the first embodiment will be described, and the description of the same configuration will be omitted. Along the rotation axis 30, the continuity structure 60 is disposed in the center, and the rotation mechanisms 22 are disposed at both sides of the continuity structure 60. The first parasitic element 42 is disposed inside the rotation mechanism 22 at the left end, and the second parasitic element 52 is disposed inside the rotation mechanism 22 at the right end.

Figure 10B:
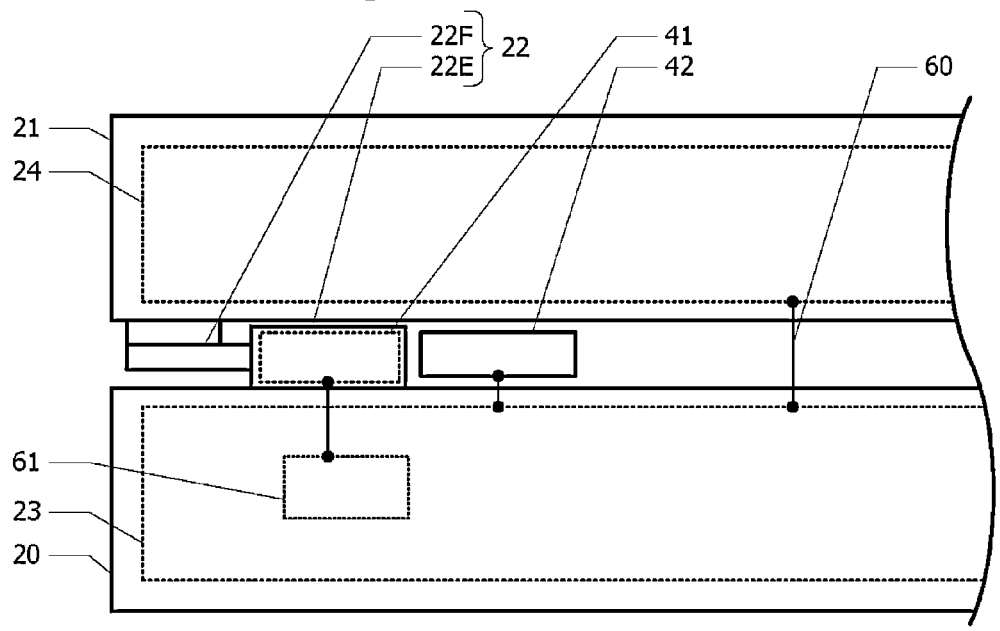
FIG. 10B is a schematic diagram of the rotation mechanism, a first parasitic element, and their vicinity.

FIG. 10B is a schematic diagram of the rotation mechanism 22, the first parasitic element 42, and their vicinity. The rotation mechanism 22 includes a first member 22E secured to the first housing 20, and a second member 22F secured to the second housing 21. At least part of the first member 22E is made of a conductive material, such as metal. The conductive part of the first member 22E is connected to the high-frequency circuit 61 and also serves as the first driven element 41. The first parasitic element 42 is electromagnetically coupled to the first driven element 41. In the fourth embodiment, as described above, at least part of the rotation mechanism 22 also serves as the first driven element 41. Since the rotation mechanisms 22 are disposed at both ends of the rotation axis 30 in the fourth embodiment, the mechanical strength of the opening and closing part of the first housing 20 and the second housing 21 can be improved. The second member 22F is electrically insulated from the second conductor plate 24 by an insulating resin or the like.

Fifth Embodiment

Figure 11A:
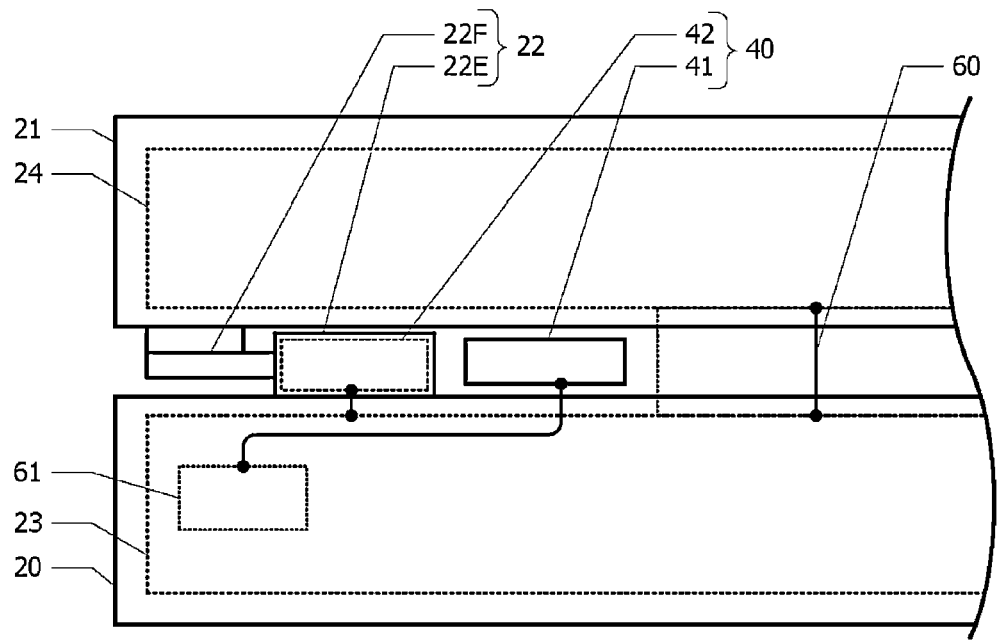
FIG. 11A is a schematic diagram of the first antenna element and its vicinity in an antenna device according to a fifth embodiment.

FIG. 11A is a schematic diagram of the first antenna element 40 and its vicinity in an antenna device according to a fifth embodiment. Hereinafter, differences from the fourth embodiment illustrated in FIG. 10B will be described, and the description of the same configuration will be omitted. The rotation mechanism 22 of the antenna device according to the fifth embodiment is the same as the rotation mechanism 22 of the antenna device illustrated in FIG. 10B in terms of the mechanical structure. In the fifth embodiment, the conductive part of the first member 22E is connected to the first conductor plate 23. The first driven element 41 is disposed inside the rotation mechanism 22. The conductive part of the first member 22E is electromagnetically coupled to the first driven element 41 and also serves as the first parasitic element 42. In the fifth embodiment, the first parasitic element 42 is disposed outside the first driven element 41.

The first member 22E operating as the first parasitic element 42 is directly grounded in the example illustrated in FIG. 11A, but may be grounded through an impedance matching circuit. For example, the first member 22E and the first conductor plate 23 may be connected to each other through an insulating resin. In this case, a capacitance generated at the point of connection can be used as an impedance matching circuit.

Sixth Embodiment

Figure 11B:
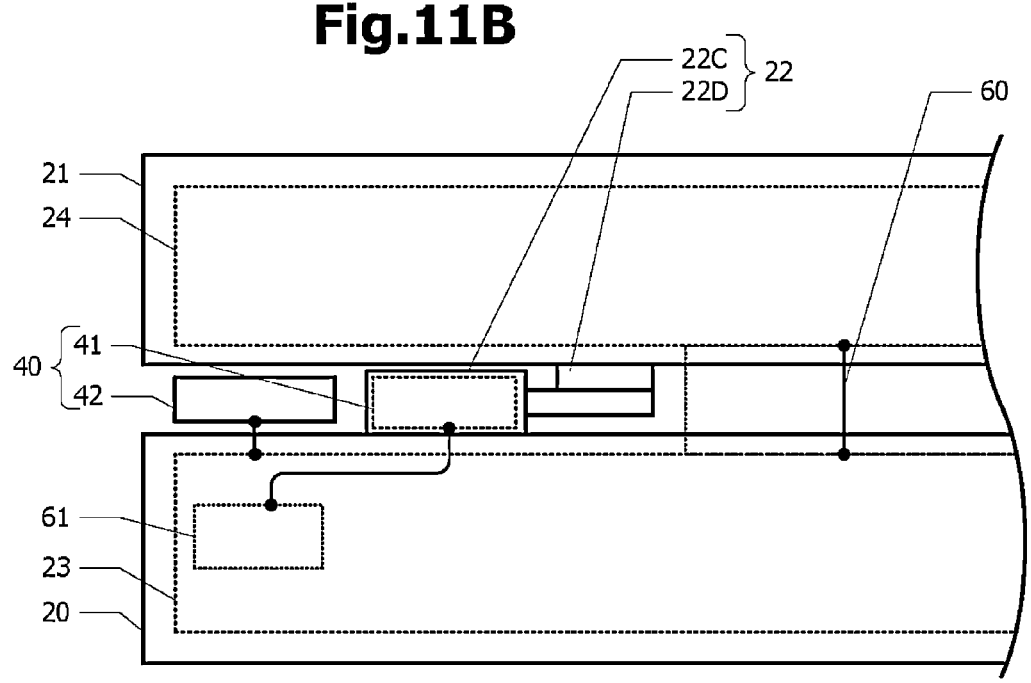
FIG. 11B is a schematic diagram of the first antenna element and its vicinity in an antenna device according to a sixth embodiment.

FIG. 11B is a schematic diagram of the first antenna element 40 and its vicinity in an antenna device according to a sixth embodiment. Hereinafter, differences from the third embodiment illustrated in FIG. 9B will be described, and the description of the same configuration will be omitted. The rotation mechanism 22 of the antenna device according to the sixth embodiment is the same as the rotation mechanism 22 of the antenna device illustrated in FIG. 9B in terms of the mechanical structure. In the sixth embodiment, the conductive part of the first member 22C is connected to the high-frequency circuit 61. The first parasitic element 42 is disposed outside the rotation mechanism 22. The conductive part of the first member 22C is electromagnetically coupled to the first parasitic element 42 and also serves as the first driven element 41. As in the fifth embodiment, the first parasitic element 42 is disposed outside the first driven element 41 in the sixth embodiment.

As described in the fifth embodiment (FIG. 11A) and the sixth embodiment (FIG. 11B), the first parasitic element 42 may be disposed outside the first driven element 41. Similarly, the second parasitic element 52 may be disposed outside the second driven element 51 (FIGS. 1 and 3).

Seventh Embodiment

Figure 12A:
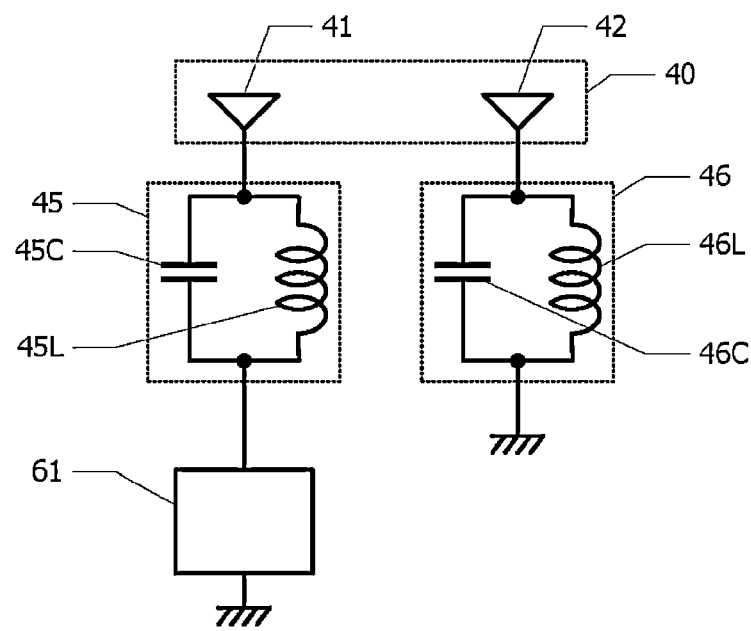
FIG. 12A is an equivalent circuit diagram of an antenna device according to a seventh embodiment.

FIG. 12A is an equivalent circuit diagram of an antenna device according to a seventh embodiment. Hereinafter, differences from the first embodiment will be described, and the description of the same configuration will be omitted. FIG. 12A shows an equivalent circuit of the first antenna element 40 (FIGS. 1 and 3). An equivalent circuit of the second antenna element 50 (FIGS. 1 and 3) is the same as that shown in FIG. 12A.

The first driven element 41 and the first parasitic element 42 form the first antenna element 40. A first LC parallel resonance circuit 45 is inserted in series with the first driven element 41. The first LC parallel resonance circuit 45 includes a capacitor 45C and an inductor 45L connected in parallel to each other. A second LC parallel resonance circuit 46 is inserted in series with the first parasitic element 42. The second LC parallel resonance circuit 46 includes a capacitor 46C and an inductor 46L connected in parallel to each other.

Figure 12B:
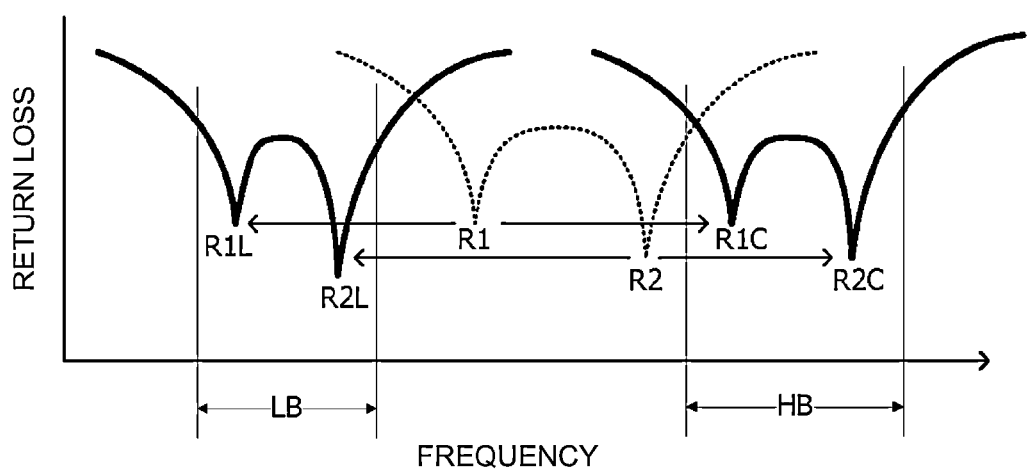
FIG. 12B is a graph showing frequency characteristics of return losses of the antenna device according to the seventh embodiment.

FIG. 12B shows frequency characteristics of return losses of the antenna device according to the seventh embodiment. A broken line indicates a return loss obtained when the first LC parallel resonance circuit 45 and the second LC parallel resonance circuit 46 are not inserted. A multi-resonant state is achieved in the first antenna element 40, and two resonance points R1 and R2 appear. For example, the resonance point R1 corresponds to the resonance of the first driven element 41, and the resonance point R2 corresponds to the resonance of the first parasitic element 42. When the first LC parallel resonance circuit 45 is inserted in series with the first driven element 41, the resonance point R1 is divided into a resonance point R1L on the low-frequency side and a resonance point R1C on the high-frequency side. The resonance points R1L and R1C are determined by the inductor 45L and the capacitor 45C, respectively, of the first LC parallel resonance circuit 45. Similarly, when the second LC parallel resonance circuit 46 is inserted in series with the first parasitic element 42, the resonance point R2 is divided into a resonance point R2L on the low-frequency side and a resonance point R2C on the high-frequency side.

The resonance points R1L and R2L appear in a first frequency band LB, and the resonance points R1C and R2C appear in a second frequency band HB higher than the first frequency band LB. A return loss in a frequency band between the first frequency band LB and the second frequency band HB is higher than those in the first frequency band LB and the second frequency band HB.

The first antenna element 40 operates in the first frequency band LB and the second frequency band HB. A multi-resonant state is achieved by the resonance points R1L and R2L in the first frequency band LB, and a multi-resonant state is achieved by the resonance points R1C and R2C in the second frequency band HB. Since a multi-resonant state is achieved in both the first frequency band LB and the second frequency band HB, a wide-band operation is possible. For example, the first frequency band LB and the second frequency band HB correspond to a band of 700 MHz to 960 MHz and a band of 1710 MHz to 2700 MHz, respectively, used in the LTE communication standard. If the second frequency band HB is extended to 1575 MHz on the low-frequency side, the first antenna element 40 can also be used as a GPS antenna.

Eighth Embodiment

Figure 13A:
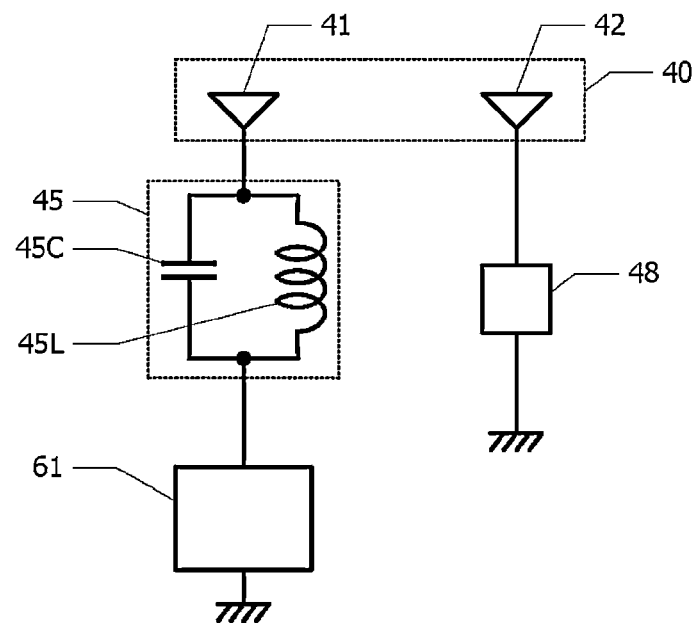
FIG. 13A is an equivalent circuit diagram of an antenna device according to an eighth embodiment.

FIG. 13A is an equivalent circuit diagram of an antenna device according to an eighth embodiment. Hereinafter, differences from the seventh embodiment will be described, and the description of the same configuration will be omitted. FIG. 13A shows an equivalent circuit of the first antenna element 40 (FIGS. 1 and 3). An equivalent circuit of the second antenna element 50 (FIGS. 1 and 3) is the same as that shown in FIG. 13A.

Although the second LC parallel resonance circuit 46 (FIG. 12A) is inserted in series with the first parasitic element 42 in the seventh embodiment, the first parasitic element 42 is grounded directly or with a reactance element 48 interposed therebetween in the eighth embodiment. The reactance element 48 may be either inductive or capacitive. As in the seventh embodiment, the first LC parallel resonance circuit 45 is inserted in series with the first driven element 41.

Figure 13B:
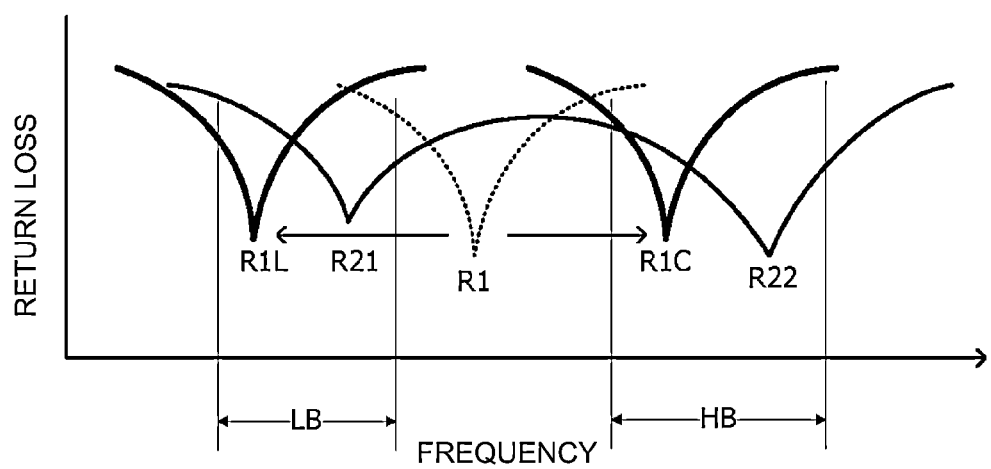
FIG. 13B is a graph showing frequency characteristics of return losses of the antenna device according to the eighth embodiment.

FIG. 13B shows frequency characteristics of return losses of the antenna device according to the eighth embodiment. A primary resonance point R21 (one-quarter wavelength mode) and a secondary resonance point R22 (three-quarter wavelength mode) originating from the first parasitic element 42 appear in the first frequency band LB and the second frequency band HB, respectively. As in the seventh embodiment, the resonance point R1 originating from the first driven element 41 is divided into the resonance point R1L and the resonance point R1C, which appear in the first frequency band LB and the second frequency band HB, respectively.

In the first frequency band LB, a multi-resonant state is achieved by the resonance point R1L originating from the first driven element 41 and the primary resonance point R21 originating from the first parasitic element 42. In the second frequency band HB, a multi-resonant state is achieved by the resonance point R1C originating from the first driven element 41 and the secondary resonance point R22 originating from the first parasitic element 42. Since a multi-resonant state is achieved in both the first frequency band LB and the second frequency band HB, a wide-band operation is possible in the eighth embodiment.

Ninth Embodiment

An antenna device according to a ninth embodiment will be described with reference to FIGS. 14A to 14D. Hereinafter, differences from the first embodiment will be described, and the description of the same configuration will be omitted. In the first embodiment, as illustrated in FIG. 2A, the first driven element 41 has a C-shaped cross section perpendicular to the rotation axis 30. The ninth embodiment presents various cross-sectional shapes of the first driven element 41 (FIGS. 1 and 3).

Figure 14A:
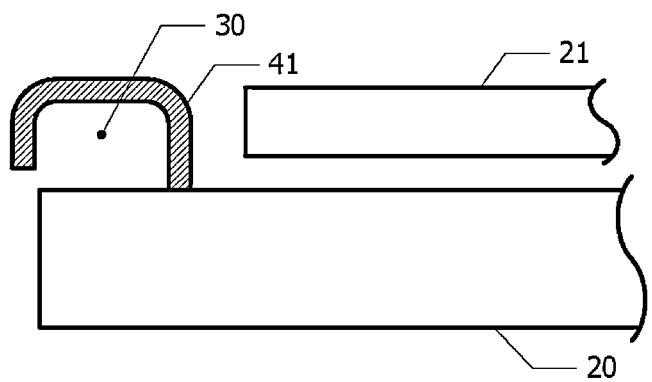
FIGS. 14A to 14D are cross-sectional views illustrating various shapes of the first driven element of an antenna device according to a ninth embodiment.
Figure 14B:
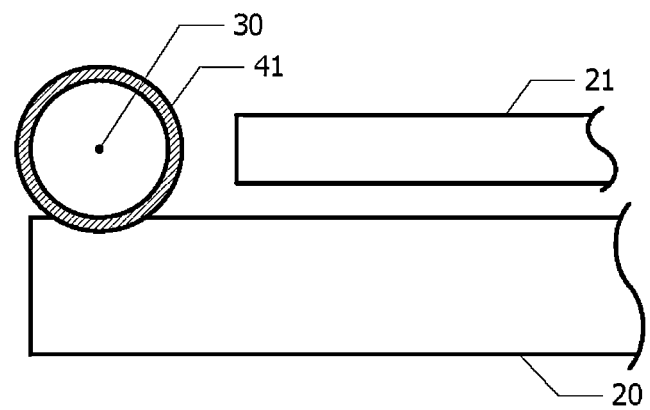
Figure 14C:
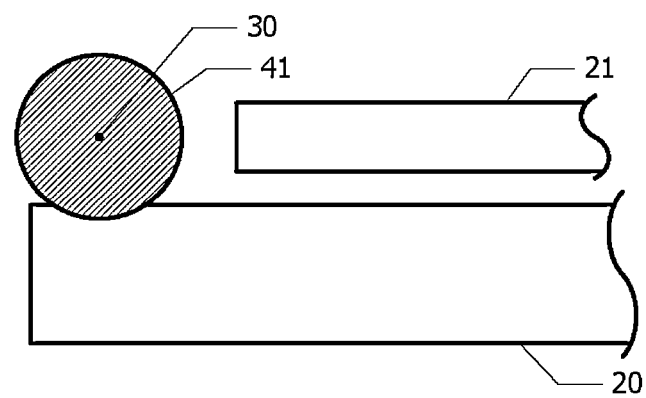
Figure 14D:
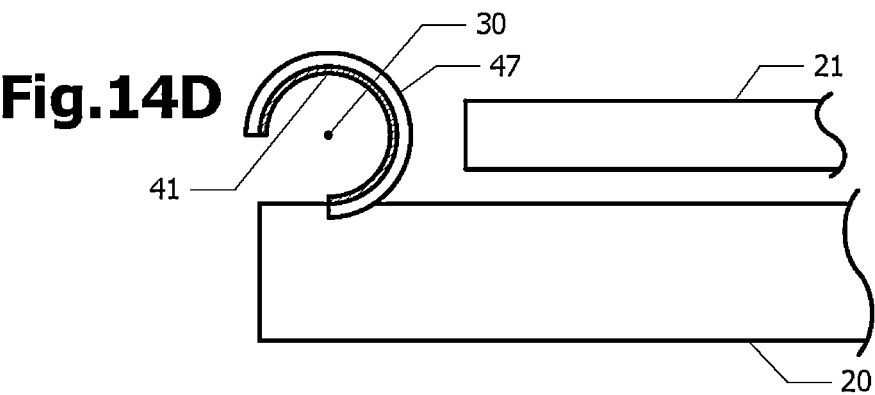

In the example illustrated in FIG. 14A, the first driven element 41 has a U-shaped cross section perpendicular to the rotation axis 30. In the example illustrated in FIG. 14B, the first driven element 41 has a cylindrical shape centered on the rotation axis 30. In the example illustrated in FIG. 14C, the first driven element 41 has a columnar shape centered on the rotation axis 30. In the example illustrated in FIG. 14D, the first housing 20 includes a tubular portion 47 made of an insulating material. The shape of the tubular portion 47 coincides with part of a cylindrical shape centered on the rotation axis 30. The tubular portion 47 has a C-shaped cross section. That is, the tubular portion 47 partly surrounds the rotation axis 30 in a circumferential direction. The first driven element 41 is made of a conductive material formed on the inner periphery of the tubular portion 47. The first parasitic element 42, the second driven element 51, and the second parasitic element 52 (FIGS. 1 and 3) may have cross-sectional shapes similar to those illustrated in FIGS. 14A to 14D.

Tenth Embodiment

An antenna device according to a tenth embodiment will be described with reference to FIGS. 15A and 15B. Hereinafter, differences from the first embodiment will be described, and the description of the same configuration will be omitted.

Figure 15A:
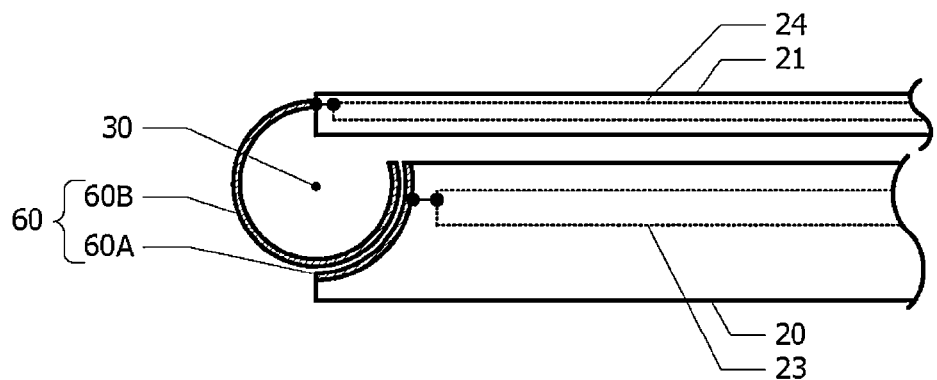
FIGS. 15A and 15B are cross-sectional views of the continuity structure and its vicinity in an antenna device according to a tenth embodiment.
Figure 15B:
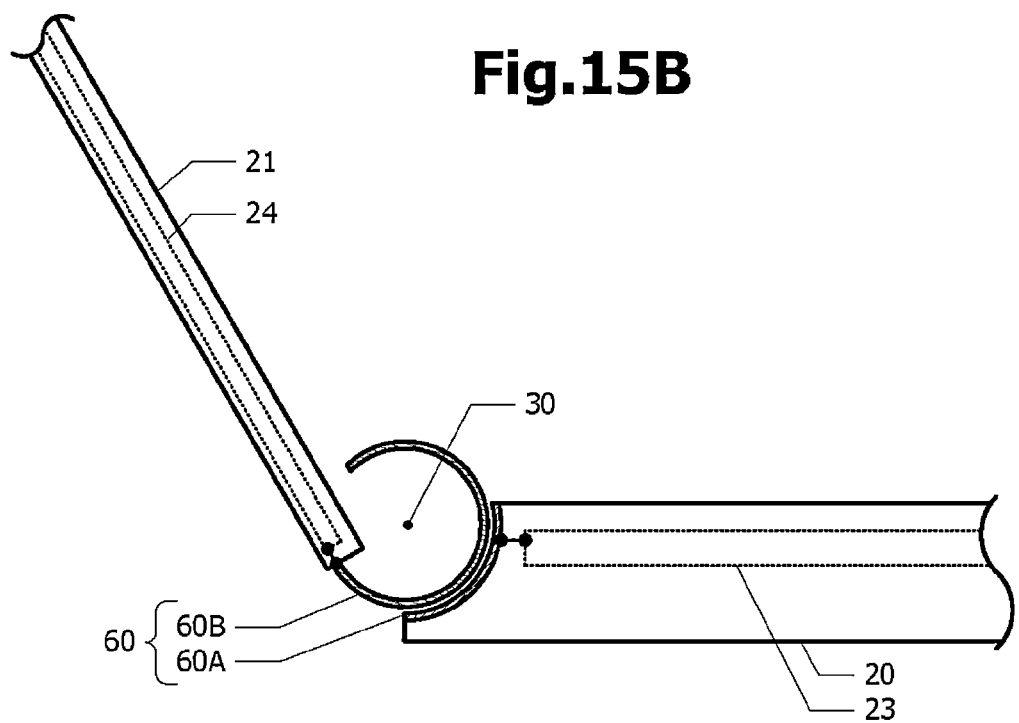

FIGS. 15A and 15B are cross-sectional views of the continuity structure 60 and its vicinity in the antenna device according to the tenth embodiment. In FIG. 15A, the second housing 21 is closed relative to the first housing 20, whereas in FIG. 15B, the second housing 21 is open relative to the first housing 20. The continuity structure 60 includes a first member 60A secured to the first housing 20 and a second member 60B secured to the second housing 21. The first member 60A and the second member 60B are both made of a conductive material, such as metal. The first member 60A is electrically connected to the first conductor plate 23, and the second member 60B is electrically connected to the second conductor plate 24.

The contours of the first member 60A and the second member 60B both coincide with part of a cylindrical shape centered on the rotation axis 30. The curvature radius of the first member 60A is slightly larger than that of the second member 60B. The inner periphery of the first member 60A faces the outer periphery of the second member 60B with a gap therebetween. The first member 60A and the second member 60B are configured such that even when the second housing 21 is opened and closed within its range of motion, the area of a region where the first member 60A and the second member 60B face each other is kept virtually unchanged.

The region where the first member 60A and the second member 60B face each other operates as a capacitor. In other words, the first conductor plate 23 and the second conductor plate 24 are connected to each other with a capacitor interposed therebetween. If the impedance between the first conductor plate 23 and the second conductor plate 24 is several ohms (Ω) or less in the frequency band where the first antenna element 40 and the second antenna element 50 (FIGS. 1 and 3) operate, the first conductor plate 23 and the second conductor plate 24 can be considered to have high-frequency continuity therebetween.

The continuity structure 60 does not need to short-circuit in a direct-current way the first conductor plate 23 and the second conductor plate 24. As described in the tenth embodiment, it is only necessary that there be high-frequency continuity between the first conductor plate 23 and the second conductor plate 24.

The present invention has been described with reference to the embodiments, but the present invention is not limited to them. For example, it is obvious to those skilled in the art that various changes, improvements, and combinations are possible.

REFERENCE SIGNS LIST

20: first housing
21: second housing
22: rotation mechanism
22A, 22C, 22E: first member
22B, 22D, 22F: second member
23: first conductor plate
24: second conductor plate
30: rotation axis
40: first antenna element
41: first driven element
42: first parasitic element
43, 44: impedance matching circuit
45: first LC parallel resonance circuit
45C: capacitor
45L: inductor
46: second LC parallel resonance circuit
46C: capacitor
46L: inductor
47: resin member
48: reactance element
50: second antenna element
51: second driven element
52: second parasitic element
53, 54: impedance matching circuit
60: continuity structure
60A: first member
60B: second member
61: high-frequency circuit

The invention claimed is:

1. An antenna device comprising:
a first housing including a first conductor plate;
a second housing including a second conductor plate;
a rotation mechanism coupling the first housing to the second housing and configured to open and close the second housing from the first housing about a rotation axis;
first and second driven elements each arranged along the rotation axis; and
a continuity structure disposed between the first driven element and the second driven element and configured to establish a direct-current electrical connection or high-frequency electrical connection between the first conductor plate and the second conductor plate.

2. The antenna device according to claim 1, wherein the first and second conductor plates have a combined thickness that is greater than or equal to one-quarter of a wavelength corresponding to a lowest frequency in an operating frequency band for the first driven element and the second driven element.

3. The antenna device according to claim 1, further comprising:
  a high-frequency circuit disposed in one of the first housing and the second housing;
  a first parasitic element disposed along the rotation axis and electromagnetically coupled to the first driven element; and
  a second parasitic element disposed along the rotation axis and electromagnetically coupled to the second driven element.

4. The antenna device according to claim 3, wherein the first driven element has a surface that faces a surface of the second conductor plate at any position within a range of motion of the second housing when the second housing is rotated about the rotation axis of the rotation mechanism.

5. The antenna device according to claim 4, wherein the surface of the first driven element has a circular shape centered on the rotation axis.

6. The antenna device according to claim 5, wherein the circular shape of the first driven element does not complete a full circle.

7. The antenna device according to claim 1, wherein the rotation mechanism includes a first member secured to the first housing and a second member secured to the second housing, and the first and second members comprise a conductive material that forms the continuity structure.

8. The antenna device according to claim 3, wherein the rotation mechanism includes a first conductive member secured to the first housing and electrically connected to the first conductor plate and a second member secured to the second housing, and wherein the conductive first member forms the first parasitic element.

9. The antenna device according to claim 1, wherein the rotation mechanism includes a conductive first member secured to the first housing and electrically connected to the high-frequency circuit and a second member secured to the second housing, and wherein the conductive first member forms the first driven element.

10. The antenna device according to claim 3, wherein the first driven element and the first parasitic element form a first antenna element configured to transmit and receive data in a first frequency band and a second frequency band that is higher than the first frequency band.

11. The antenna device according to claim 10, wherein the first antenna element has a return loss higher in a frequency band between the first frequency band and the second frequency band.

12. The antenna device according to claim 10, wherein the first antenna element is configured to operate in a multi-resonant state.

13. The antenna device according to claim 10, wherein the antenna device further comprises a first LC parallel resonance circuit connected in series with at least one of the first driven element and the first parasitic element.

14. The antenna device according to claim 13, wherein the first LC parallel resonance circuit is disposed at a resonance point between the first driven element and the high-frequency circuit element, and wherein the resonance point appears in the first frequency band and the second frequency band.

15. The antenna device according to claim 14, further comprising a second LC parallel resonance circuit connected in series between the first parasitic element and ground at a resonance point that appears in the first frequency band and the second frequency band.

16. The antenna device according to claim 14, wherein a primary resonance point and a secondary resonance point of the first parasitic element appear in the first frequency band and the second frequency band, respectively.

17. The antenna device according to claim 1, wherein the first housing includes a tubular member that partly surrounds the rotation axis in a circumferential direction, and the first driven element includes a conductive material formed on an inner periphery of the tubular member.

18. An antenna device comprising:
  a first housing including a first conductor plate;
  a second housing including a second conductor plate;
  a rotation mechanism coupling the first housing to the second housing and configured to open and close the second housing from the first housing about a rotation axis; and
  first and second driven elements each arranged along the rotation axis,
  wherein the rotation mechanism includes a first member secured to the first housing and a second member secured to the second housing, and the first and second members comprise a conductive material that establishes a direct-current electrical connection or high-frequency electrical connection between the first conductor plate and the second conductor plate.

19. The antenna device according to claim 18, further comprising:
  a high-frequency circuit disposed in one of the first housing and the second housing;
  a first parasitic element disposed along the rotation axis and electromagnetically coupled to the first driven element; and
  a second parasitic element disposed along the rotation axis and electromagnetically coupled to the second driven element.

20. The antenna device according to claim 19, wherein the first driven element and the first parasitic element form a first antenna element configured to transmit and receive data in a first frequency band and a second frequency band that is higher than the first frequency band.

* * * * *